Dec. 26, 1950

H. L. KINDORF 2,535,427

CONDUIT SUPPORTING FRAME

Filed April 2, 1946

INVENTOR.
HARRY L. KINDORF
BY Charles M Fryer
ATTORNEY.

Dec. 26, 1950      H. L. KINDORF      2,535,427
CONDUIT SUPPORTING FRAME
Filed April 2, 1946      2 Sheets-Sheet 2
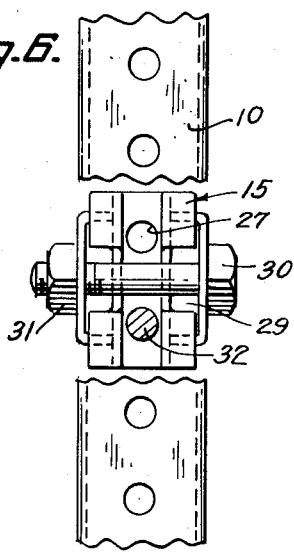
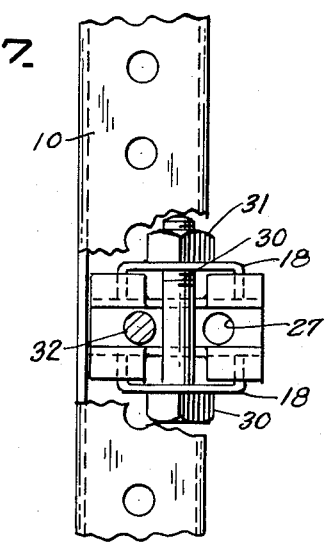
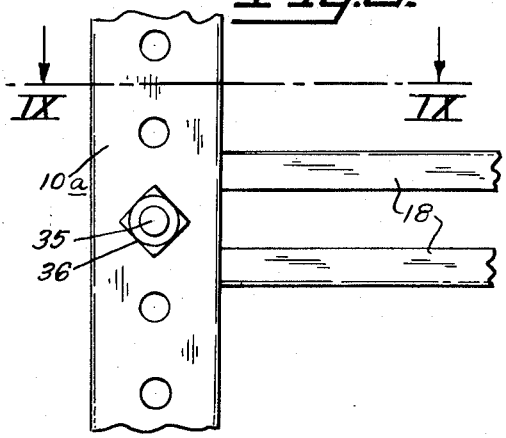
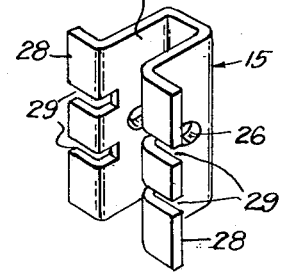
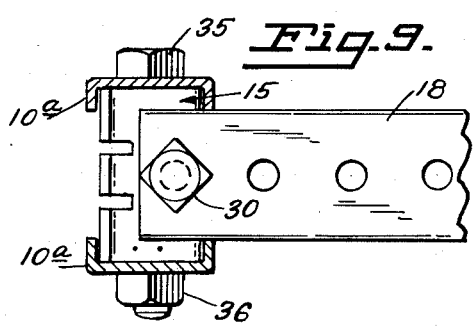
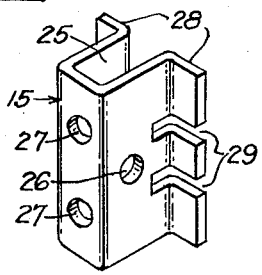
INVENTOR.
HARRY L. KINDORF
BY Charles M. Fryer
ATTORNEY.

Patented Dec. 26, 1950

2,535,427

UNITED STATES PATENT OFFICE 2,535,427

CONDUIT SUPPORTING FRAME

Harry L. Kindorf, San Francisco, Calif., assignor, by mesne assignments, to The Kindorf Co., San Francisco, Calif., a corporation of California Application April 2, 1946, Serial No. 658,985

5 Claims. (Cl. 248—68)

The present invention relates to framework for the support of conduits, pipes, cables, and the like with relation to the structures in which they are disposed.

In buildings, ships, and other structures where conduits or cables are employed, it is customary to provide supports for the conduits or cables at frequent points throughout their lengths. Where the conduits or cables are led along walls or ceilings, simple brackets are usually secured to the adjacent surface of the structure and the conduits or the like are in turn secured to these brackets. There are, however, many instances where the conduits or cables are not located in proximity to a supporting surface and some sort of framework must be constructed for their support.

It is to framework of this kind that the present invention pertains, and it is an object of the invention to provide a framework that can be made up of a small number of standard parts capable of being readily assembled to assume many different shapes and forms which may be required for supporting purposes. A further object of the invention is to provide means for constructing a framework of no more than two different metal shapes connectable by common nuts and bolts and which may be assembled in many different arrangements, all simple and rigid in construction and each of which comprises pairs of opposed channel-shaped members properly spaced for the reception of a standard type of conduit securing means. Further and more specific objects and advantages of the invention are made apparent in the following specification wherein reference is made to the accompanying drawings in which the invention is illustrated.

In the drawings:

Fig. 6 is a fragmentary view in elevation with parts in section and parts broken away as viewed from the line VI—VI of Fig. 3;

Fig. 7 is a fragmentary view with parts in section and parts broken away as viewed from the line VII—VII of Fig. 4;

Fig. 8 is a fragmentary view in elevation illustrating a connection between channel-shaped beams which differs from that shown in Figs. 3 and 4;

Fig. 9 is a sectional view taken on line IX—IX of Fig. 8;

Fig. 10 is a view in isometric projection of a connecting member which is employed in each of the connections illustrated in Figs. 3, 4, and 8; and Fig. 11 is a similar view of the same connecting member oppositely disposed.

The framework of the present invention is made up principally of beams of channel-shaped cross section having perforations through their web portions at equally spaced intervals throughout their lengths. The perforations are preferably spaced a distance equal to a standard unit of measurement such as an inch, so that the beams may be cut at points between perforations to obtain practically any desired length measured in inches. Connecting members are provided for connecting these beams to each other in various right angularly disposed combinations and each of said combinations includes a pair of beams parallel to each other and spaced at a distance to accommodate a well known type of conduit clamp by means of which a conduit may be secured to the framework. As the connecting members employed for connecting the beams in different combinations of positions are all identical and as the beams which make up the framework are identical in cross section and capable of being cut to desired lengths by a hack saw or similar tool, any size or style of framework required may be designed and assembled on the job with the use of standard materials and simple tools.

Figure 1:
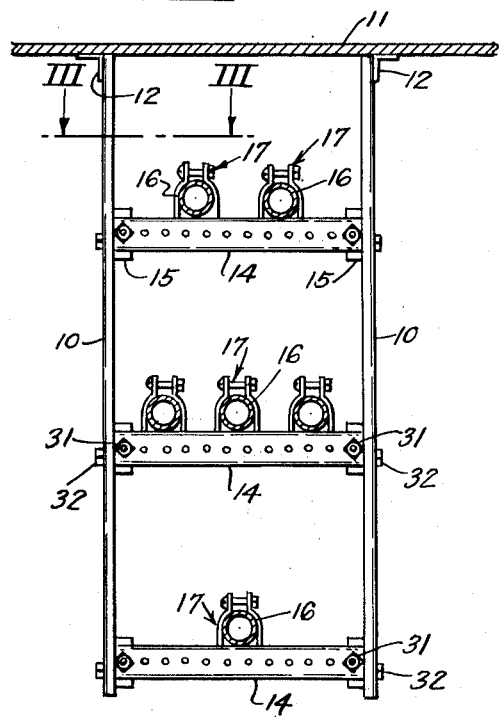
Fig. 1 is a front elevation of a framework embodying the present invention and designed for the support of horizontally disposed conduits.

Referring to Fig. 1 of the drawings for example, a framwork is illustrated as comprising a pair of channel beams 10 which descend from the ceiling or deck head 11 by which they are supported and to which they may be connected in any suitable manner, as for example by welding, and if desired by the use of reinforcing brackets illustrated at 12. Extending between and supported by the vertically disposed channels 10 are cross beams 14, each of which is made up of a pair of opposed channel members secured at their ends to the members 10 as by brackets 15, the construction of which will presently be described in detail. The cross beams 14 in this case provide supports for horizontally disposed conduits such as illustrated at 16 which may be arranged either above or below the cross beams and which are secured to them by clamping devices generally indicated at 17, also presently to be described.

Figure 2:
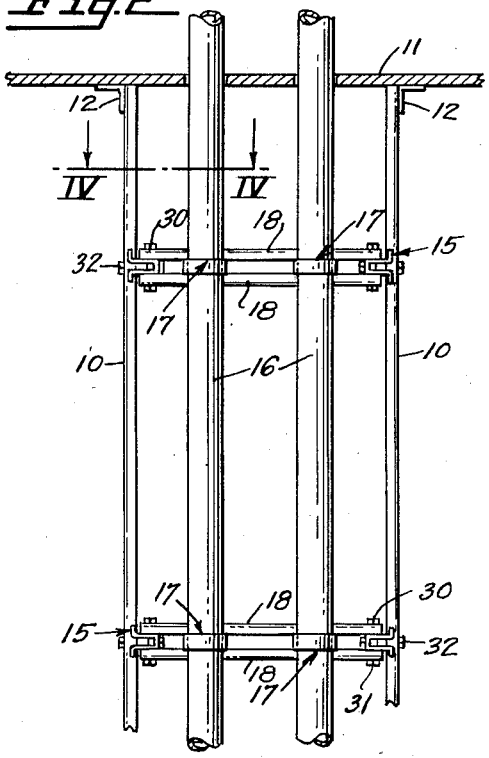
Fig. 2 is a similar view of a framework made up of the same parts as those illustrated in Fig. 1 but arranged for the support of vertically disposed conduits.

Fig. 2 of the drawings illustrates a somewhat similar framework for supporting conduits 16 in a vertical position as, for example, where they extend through the deck head 11. In this figure the vertical beams 10 of the framework are identically arranged and supported by cross beams 18 extended between them which differ from the cross beams 14 illustrated in Fig. 1 in that the channels of which they are formed are disposed with their main web faces in horizontal planes rather than in vertical planes and therefore provide slots or intermediate spaces for reception of the hanger members 17 at right angles to the position in which they are shown in Fig. 1.

Figure 4:
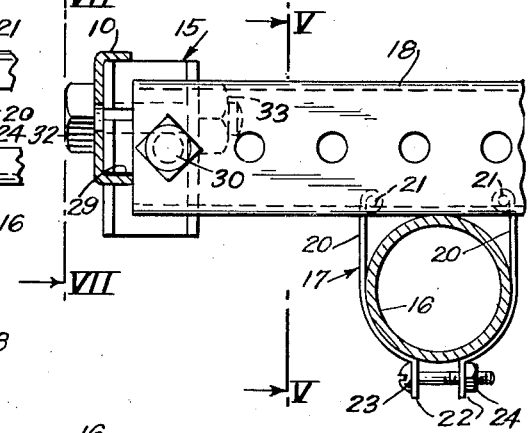
Fig. 4 is an enlarged fragmentary sectional view taken on line IV—IV of Fig. 2.
Figure 5:
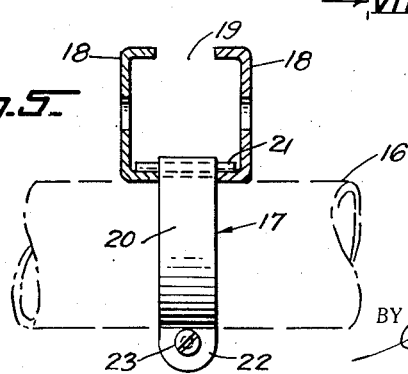
Fig. 5 is a section taken on the line of V—V of Fig. 4.

In each of the arrangements shown in Figs. 1 and 2 the channel members which form the conduit supporting beams 14 and 18 respectively are arranged in opposed pairs with their webs in parallel planes and their legs extended toward each other so that they assume the position best illustrated in Fig. 5 where two channel members 18 are shown as opposed and spaced to provide slot like openings 19 between the edges of their legs. The width of the slot like openings 19 is preferably just sufficient to receive the standard conduit securing devices 17 which comprise as shown in Figs. 4 and 5 a pair of bent straps 20 each of which carries a transversely extending pin 21 at one of its ends arranged to be supported against the inner faces of the channel legs. The opposite end of each of the straps 20 is provided with an ear 22 perforated for the reception of a bolt 23 which has a nut 24 capable of being tightened on the bolt to draw the ears 22 together and to securely hold the conduit against the supporting beam made up of the channels 18. In the present illustration, a simple form of conduit is shown but it is to be understood that this representation is adopted as typical of any type of conduit, pipe, cable or a similarly shaped article and that the clamping devices 17 are available in various sizes to accommodate different members to be clamped through the width of the straps 20 of which they are made is uniform so that the standard spacing 19 between the channels 18 is suitable in all cases. Furthermore as each pair of supporting channels 18, when properly disposed, provides two of the slot like spaces 19 shown in Fig. 5, the conduits may be secured to either or both sides of the supporting beam by the same type of securing means.

In each of the different examples shown in Figs. 1 and 2 the connecting members which are generally indicated at 15 are of identical construction though differently arranged. The construction of these members is shown in Figs. 10 and 11 wherein the connecting member is shown as comprising a U-shaped body 25 which includes perforations 26 in its leg portions for the reception of a bolt which may extend straight through the U-shaped body. A pair of perforations 27 is provided in its web portion for the reception of bolts disposed at right angles to the bolt passing through the perforations 26 and the perforations 27 are spaced sufficiently on opposite sides of the perforations 26 to permit the passage of bolts in both directions without interference. The connecting member 15 is also preferably but not necessarily provided with outwardly extending right angularly disposed flanges 28 at the ends of its leg portions. A pair of slots 29 is cut through each of the flanges 28 and the slots extend, as shown, a short distance into the legs of the U-shaped body portion. The slots 29 are arranged in opposed and aligned pairs. The U-shaped portion 25 of the connecting member has an outside dimension or width necessary to provide the desired spacing 19 of Fig. 5 between opposed supporting channels 18.

Figure 3:
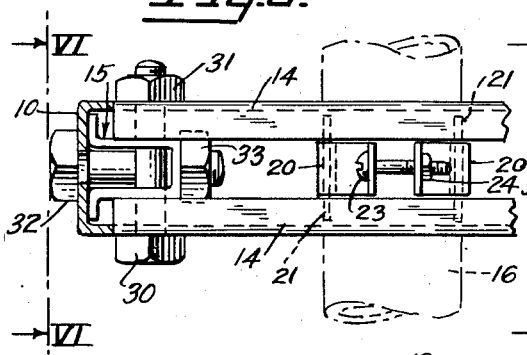
Fig. 3 is an enlarged fragmentary sectional view taken on the line III—III of Fig. 1.

The manner in which one of the connecting members 15 is employed to form the connection between the vertical beams 10 and the horizontal beams 14 shown in Fig. 1 is illustrated in Figs. 3 and 6 where a bolt 30 is shown as passing through the end-most perforation in the sections of channel 14 and also through the perforations 26 in the connecting member so that a nut 31 on the bolt draws the channels into desired opposed relation properly spaced by the interposition of the U-shaped portion of the connecting member to which they become firmly secured by tightening of the nut 31. The flanges 28 present an over-all width capable of being received within the channel which forms the vertical member 10 and a bolt 32 extends through one of the perforations in the vertical member 10 and also through one of the perforations 27 in the web of the U-shaped portion of the connecting member. This bolt has a nut 33 which upon being tightened draws the member 10 toward the ends of the members 14 and establishes a secure connection between the right angularly disposed channel shaped members.

The manner of securing the channel shaped members together in the relationship illustrated in Fig. 2 is shown in Figs. 4 and 7, wherein the connecting member 15 is secured between the spaced parallel channels 18 in the same manner as illustrated in Figs. 3 and 6 by means of the bolt 30 and nut 31. In this arrangement the channel 10 which is not of sufficient width to receive the entire length of the flanges 28 between its webs is arranged, as shown in Fig. 4, with one of its webs disposed in one pair of the slots 29 of the connecting member, and the opposite web embracing an end of the connecting member. Again the same bolt 32 may be employed with its nut 33 to pass through a perforation of the channel 10 and also through one of the perforations 27 in the connecting member to draw the channel toward and firmly secure it with relation to the ends of the spaced channels 18. As but one of the holes 27 in the connecting member is employed in this arrangement and also but one of the pairs of slots 29 is necessary to receive the leg of the channel, it is apparent that the connecting member could be made with a single hole 27 and a single pair of slots 29 in its flanges rather than two pairs of slots as shown. This duplication is, however, preferred as it is possible in assembling the parts in the relationship illustrated in Figs. 4 and 7 to reverse the position of the connecting member and with the present arrangement it may be placed in either of its two end for end positions and in each case one of the holes 27 and one of each pair of slots 29 will be properly disposed for the reception of the bolt 32 and the leg of the channel respectively as shown.

A still further arrangement of the framework is illustrated in Figs. 8 and 9 and the arrangement there shown is desirable for cases similar to that illustrated in Fig. 2 but where greater strength is required of the vertically disposed channel members 10. In this case the channel members 10 may be employed in opposed pairs to add structural strength to the framework, and such pairs of channel members are shown at 10a as embracing opposite ends of the connecting member 15 to which they are secured as by means of a bolt 35 which extends through perforations in the channel member and lengthwise through the U-shaped portion of the connecting member 15 so that a nut 36 may be tightened on the bolt to draw the opposed channel members into firm contact with the ends of the connecting member 15. The member 15 is, as in the other two arrangements herein illustrated, also secured between the opposed channels 18 by the bolt 30 as hereinbefore described.

With the invention herein described, framework can readily be assembled and disposed in a position to support any number and size of conduit-like members and, through the use of standard parts which may be carried in quantity and readily cut to size on a job, a great variety of frameworks can readily be erected to provide conduit supporting members which include slots for conveniently receiving standard types of conduit securing members in many different positions.

I claim:

1. A conduit supporting frame comprising channel beams of identical cross section, and connecting members adapted to be disposed between two of said beams adjacent their ends for holding them in spaced relation and for connecting them with an adjacent beam, all of said beams having perforations disposed at spaced intervals throughout the length of their web portions, and said connecting members having perforations for the reception of bolts passed through perforations in the channel beams.

2. In a frame for supporting conduits or the like comprising beams made up of opposed channel members and supported by beams of similarly shaped channel members, a U-shaped connecting member adapted to be disposed between the channels of the first beams for holding them in spaced relation, and means for securing said connecting member to the second beam.

3. A frame for supporting conduits or the like comprising a pair of spaced parallel U-shaped channels with perforations adjacent their ends, a perforated U-shaped connecting member disposed between the channels, a bolt passing through the channels and the connecting member, a supporting channel extending across the ends of the parallel channels, and a bolt extending through the supporting channel and said connecting member.

4. A frame for supporting conduits or the like comprising a pair of spaced parallel U-shaped channels with perforations adjacent their ends, a perforated U-shaped connecting member disposed between the channels, a bolt passing through the channels and the legs of the connecting member, a supporting channel extending across the ends of the parallel channels, and a bolt extending through the supporting channel and the web of said connecting member.

5. A frame for supporting conduits or the like comprising a pair of spaced parallel U-shaped channels with perforations adjacent their ends, a perforated U-shaped connecting member disposed between the channels, a bolt passing through the channels and the legs of the connecting member, a supporting channel extending across the ends of the parallel channels, and a bolt extending through the supporting channel and the web of said connecting member, the legs of the connecting member having flanges at their ends engageable with the inner face of the web on the supporting channel.

HARRY L. KINDORF.

REFERENCES CITED

The following references are of record in the file of this patent:

UNITED STATES PATENTS

| Number | Name | Date |
| --- | --- | --- |
| 279,249 | Jackson | June 12, 1883 |
| 691,599 | Clark | Jan. 21, 1902 |
| 1,819,970 | Peden | Aug. 18, 1931 |
| 1,850,118 | Meyers | Mar. 22, 1932 |
| 1,888,155 | Biedinger | Nov. 15, 1932 |
| 2,177,699 | Fisher | Oct. 31, 1939 |
| 2,345,650 | Attwood | Apr. 4, 1944 |
| 2,367,750 | Berkow et al. | Jan. 23, 1945 |
| 2,375,513 | Bach | May 8, 1945 |
| 2,439,067 | Wood | Apr. 6, 1948 |

FOREIGN PATENTS

| Number | Country | Date |
| --- | --- | --- |
| 153,973 | Great Britain | Nov. 19, 1920 |